UNITED STATES PATENT OFFICE.

WILLIAM E. RIDENOUR, OF PHILADELPHIA, PENNSYLVANIA, ASSIGNOR TO FRANKLIN CHEMICAL WORKS, OF PHILADELPHIA, PENNSYLVANIA, A CORPORATION OF PENNSYLVANIA.

COMPOSITION OF HYDRATED SODIUM CARBONATE AND SODIUM TANNATE.

958,893. Specification of Letters Patent. Patented May 24, 1910.

No Drawing. Application filed July 29, 1908. Serial No. 445,898.

*To all whom it may concern:*

Be it known that I, WILLIAM E. RIDENOUR, a citizen of the United States, residing in the city of Philadelphia, county of Philadelphia, and State of Pennsylvania, have invented certain Improvements in the Composition of Hydrated Sodium Carbonate and Sodium Tannate.

My present improvements in the manufacture of combined hydrated sodium carbonate and sodium tannate comprise, in the preferred form, a non-crystalline compound produced by mixing sodium carbonate, an amount of water sufficient for producing the hydration desired without dissolving the sodium carbonate and tannin extract sufficient for coloring the product while leaving the bulk of it in the form of hydrated sodium carbonate.

In practice the tannin extract may be added conveniently either to the water or the sodium carbonate, and these are then mixed gradually by means of a mechanical mixer; the ingredients used being preferably in the proportions of about five hundred pounds of sodium carbonate in the form of soda ash, one hundred and twenty to two hundred pounds of water, and from ten to fifty pounds of tannin extract in solution of about 20 degrees Baumé strength. But the tannin may be mixed in powdered form with the sodium carbonate prior to the addition of the water, an amount of the extract sufficient to give color to the product being used. The mass is continually stirred, with evolution of steam and heat, until it is finally cooled, when it is found in an amorphous and powdered condition, chiefly consisting of hydrated sodium carbonate with a portion of sodium tannate, which is highly useful, for instance as a boiler compound.

These improvements, as to form, composition and mode of production, are of great value. The product is of more uniform character and in a form more economically used and better suited to the trade than is the usual crystalline product produced by the usual practice; and the mode of its production effects a great saving in time, apparatus, fuel, space and labor.

Having described my invention, I claim:

1. A composition of matter produced by the combination of sodium carbonate, water and tannin extract in proportion producing an amorphous product, substantially as specified.

2. A composition of matter produced by the combination of sodium carbonate, a tannin extract, and sufficient water to hydrate the sodium carbonate without dissolving it, substantially as specified.

3. A composition of matter produced by the combination of sodium carbonate in the form of soda ash, water and tannin extract, in the proportion of about five hundred pounds of soda ash to approximately one hundred and twenty to two hundred pounds of water, and from ten to fifty pounds of tannin extract in solution, substantially as specified.

4. A composition of matter produced by the combination of sodium carbonate, a small amount of tannin extract and water in insufficient quantity to form crystalline hydrated sodium carbonate, the combination of the water with the sodium carbonate being effected gradually and accompanied by stirring, substantially as specified.

In witness whereof I have hereunto set my name this 22nd day of July, A. D. 1908, in the presence of the subscribing witnesses.

WM. E. RIDENOUR.

Witnesses:
ROBERT JAMES EARLEY,
JOS. G. DENNY, Jr.